Figure 1:
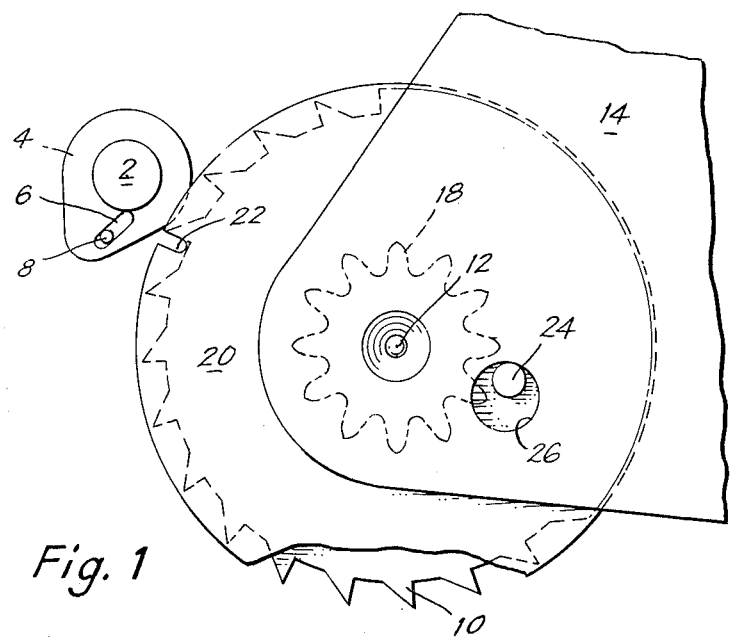

April 25, 1961  P. A. STUDER  2,981,117
INDEXING MECHANISM FOR ELECTRICAL TIMEPIECES
Filed April 8, 1960

INVENTOR
Philip A. Struder,

BY Diggins + LeBlanc
ATTORNEYS

United States Patent Office 2,981,117
Patented Apr. 25, 1961

2,981,117
INDEXING MECHANISM FOR ELECTRICAL TIMEPIECES
Philip A. Studer, Lancaster, Pa., assignor to Hamilton Watch Company, Lancaster, Pa., a corporation of Pennsylvania
Filed Apr. 8, 1960, Ser. No. 20,981
7 Claims. (Cl. 74—126)

This invention relates to an indexing mechanism for electric timepieces and more particularly to an improved mechanism which insures that only one index or movement is imparted to the gear train and/or contact system of the timepiece for each oscillation of the balance system, irrespective of the angular travel of the balance system.

In electric timepieces of the type shown in United States Patent No. 2,662,366 to Fred Koehler, assigned to the same assignee as the present application, the balance staff of the timepiece carries a magnetic bar or armature which is mounted between the poles of an electromagnet, and the electromagnet is periodically energized to cause oscillating movement of the magnetic armature and hence of the balance staff to which it is attached. The balance staff carries an indexing element, such as an index spring, which engages the teeth of an index wheel to impart rotary motion thereto.

A problem which is sometimes encountered in electric timepieces of the type just described is that the impulse provided to the balance wheel by the electromagnetic drive means sometimes causes the balance wheel to oscillate through an angle greater than 360 degrees, with the result that more than one indexing movement is imparted to the gear train and/or contact system of the timepiece during a single oscillation of the balance system, whereas only such indexing movement should be imparted for each oscillation of the balance system.

According to the present invention it has now been found that this difficulty may be overcome by means of a relatively simple index arrangement. In achieving this end, there is provided in accordance with an embodiment of this invention an auxiliary index wheel or member which is journalled for oscillatory motion on the staff which supports the main index wheel. The auxiliary index wheel has a peripheral edge which is interposed in the path of radial movement of the index spring carried by the balance staff to the teeth of the index wheel. The auxiliary index wheel has a single slot in its periphery having an initial position in the same radial plane as the tooth next to be indexed, and permits radially inward movement of the index spring into engagement with the tooth to be indexed.

On the indexing movement of the index spring, the slot of the auxiliary index wheel is indexed the same peripheral distance as the tooth of the main index wheel, but is returned to its initial position on the backswing of the index spring. However, if the balance wheel turns through more than a complete turn on its indexing or driving movement, the slot of the auxiliary index wheel will not be in a position to receive the index spring on the second turn of the balance wheel, with the result that the index spring will merely slide around the periphery of the auxiliary index wheel, and will not engage the teeth of the main index wheel in driving relation.

It is accordingly a primary object of this invention to provide an improved indexing mechanism for an electric timepiece.

It is another object of the invention to provide an improved indexing mechanism for an electric timepiece which insures that only one indexing movement is imparted for each oscillation of the balance system, regardless of the angular travel of the balance system.

Figure 2:
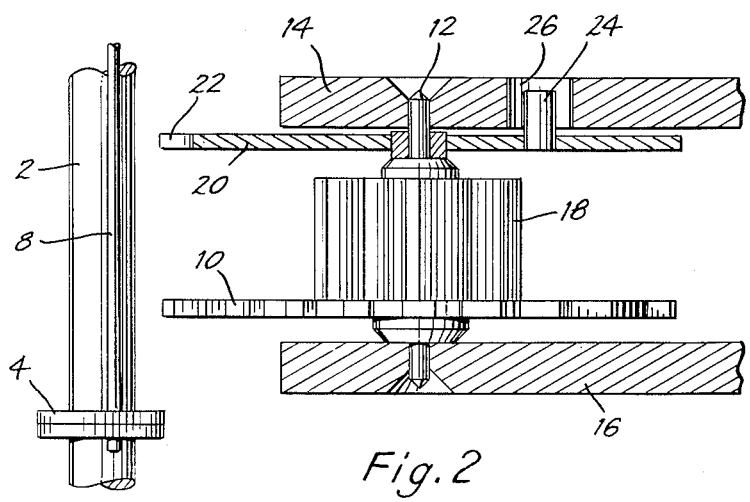

Further objects and advantages of the invention will become apparent on reference to the attached specification and claims and appended drawing wherein:

Figure 1 is a top plan view of the improved indexing mechanism of the invention; and Figure 2 is a view in vertical elevation, partially in section of the mechanism shown in Figure 1.

The indexing mechanism which is the subject of this application is intended for use in an electric timepiece of the type shown in Koehler Patent 2,622,366 and reference may be had to that patent for a detailed description of the timepiece itself.

Referring now to the drawing, there is shown a balance staff 2 having attached thereto a spring retainer 4 having a slot 6 which receives an indexing element in the form of the free straight end of index spring 8 carried by the balance wheel, as shown in the aforementioned Koehler patent. Index spring 8 moves with balance staff 2 during the oscillatory movement thereof caused by the electromagnetic drive, and engages the index members to be hereinafter described in driving relation.

Positioned adjacent balance staff 2 and index spring 8 is a toothed index wheel 10 which is rigidly mounted on an index staff 12 journalled for rotation in upper and lower bridge members 14 and 16, respectively. Also rigidly affixed to index staff 12 is an index pinion 18 which is in geared engagement with a gear train (not shown) which drives the hands of the time piece.

In accordance with the invention, an auxiliary index wheel 20 having a diameter substantially the same as that of the main index wheel 10 is journalled for oscillatory motion on index staff 12. Auxiliary index wheel 20 is provided with a single radially extending slot 22 in its periphery, the slot being located in a portion of auxiliary index wheel 20 which lies in the same radial plane as the tooth of main index wheel 10 which is being engaged by index spring 8. The remaining portion of the outer periphery of auxiliary index wheel 20 is unslotted and serves as a barrier interposed in the path of radial movement of index spring 8 to the teeth of index wheel 10, to thereby prevent engagement of index spring 8 with the teeth of index wheel 10 whenever balance staff 2 oscillates through more than a single turn.

Auxiliary index wheel 20 carries a pin member 24 which is received in a hole or slot 26 in upper bridge 14. The engagement of pin 24 with hole 26 limits the angular travel of auxiliary index wheel 20 so that in any environment of shock or vibration which might move it out of its correct position only one-half oscillation of the balance staff would be required to reset it to its proper position. The position of auxiliary index wheel 20 may be readjusted with respect to main index wheel 10 by means of pin member 24 in the event that the auxiliary index wheel becomes improperly oriented due to shock, vibration, or other cause.

The operation of the indexing mechanism of the invention will now be described:

During the normal operation of the balance wheel provided by the electromagnetic drive, balance staff 2 oscillates through less than a complete revolution in each direction on the indexing stroke and backswing movement, respectively. On the indexing stroke of balance staff 2, index spring 8 enters slot 22 of auxiliary index wheel 20 and engages a tooth of main index wheel 10 to advance the main index wheel by one tooth. On the backswing of balance wheel 2 and of index spring 8, the index spring again enters slot 22 of the auxiliary index wheel and returns the auxiliary index wheel to its initial position in which slot 22 lies in the same radial plane at the next tooth to be advanced. On the backswing of index spring 8, the spring rides over the tooth of main index wheel 10 which has just been advanced so that the backswing of index spring 8 does not impart a return movement to main index wheel 10.

If balance staff 2 should rotate more than a full turn during its indexing swing, slot 22, which will have been indexed beyond its initial position on the first portion of the oscillation of index spring 8, will not be in a position to receive index spring 8 on the second turn of balance staff 2. Hence, index spring 8 will merely slide along the outer unslotted portion of the periphery of auxiliary index wheel 20, thereby maintaining index spring 8 radially outwardly of the teeth on index wheel 10 so that spring 8 does not engage the teeth of index wheel 10 in driving relation. Thus, any additional increment of rotation of balance staff 2 in addition to a full turn thereof is ineffective to impart any rotation to index wheel 10.

It can be seen from the foregoing that there is provided in accordance with this invention an improved indexing mechanism for use in electromagnetic timepieces which insures that only one indexing movement is imparted to the gear train and/or contact system of the timepiece during each oscillation of the balance system, irrespective of the angular travel of the balance system.

The invention may be embodied in other specific forms without departing from the spirit or essential characteristics thereof. The present embodiment is, therefore, to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed and desired to be secured by United States Letters Patent is:

1. An indexing mechanism for a timepiece, comprising a balance staff mounted for oscillatory motion, a toothed index wheel mounted for rotation adjacent said balance staff, an indexing element carried by said balance staff and engaging said index wheel to drive said index wheel upon movement of said balance wheel in one direction, an auxiliary index member mounted for oscillatory movement about the axis of rotation of said index wheel, said auxiliary index member having a peripheral edge interposed in the path of radial movement of said indexing element to the teeth of said index wheel, said auxiliary index member having a slot extending radially inwardly from said peripheral edge to admit said indexing element into driving engagement with a tooth of said index wheel, said slot having an initial position located in substantially the same radial plane as the tooth of said index wheel which is to be indexed, whereby the slot of said auxiliary index member is indexed along with said index wheel on the indexing stroke of said indexing element and is returned to said initial position on the backswing motion of said indexing element.

2. An indexing mechanism as defined in claim 1 in which said indexing element is a spring member.

3. An indexing mechanism as defined in claim 1 in which said index wheel and said auxiliary index member are carried by a common staff member.

4. An indexing mechanism as defined in claim 1 including means for adjusting the position of said auxiliary index member relative to said index wheel.

5. An indexing mechanism as defined in claim 1 including means for limiting the travel of said auxiliary index member relative to said index wheel.

6. In combination with an electric timepiece having an oscillating balance staff, a toothed index wheel mounted for rotation adjacent said balance staff, an indexing element carried by said balance staff and engaging said index wheel to drive said index wheel upon movement of said balance wheel in one direction, an auxiliary index member mounted for oscillatory movement about the axis of rotation of said index wheel, said auxiliary index member having a peripheral edge interposed in the path of radial movement of said indexing element to the teeth of said index wheel, said auxiliary index member having a slot extending radially inwardly from said peripheral edge to admit said indexing element into driving engagement with a tooth of said index wheel, said slot having an initial position located in substantially the same radial plane as the tooth of said index wheel which is to be indexed, whereby the slot of said auxiliary index member is indexed along with said index wheel on the indexing stroke of said indexing element and is returned to said initial position on the backswing motion of said indexing element.

7. In combination with an electric timepiece having an oscillating balance staff, a toothed index wheel mounted for rotation adjacent said balance staff, an index spring carried by said balance staff and engaging said index wheel to drive said index wheel upon movement of said balance wheel in one direction, an auxiliary index wheel mounted for oscillatory movement about the axis of rotation of said index wheel, said auxiliary index wheel having a peripheral edge interposed in the path of radial movement of said indexing element to the teeth of said index wheel, said auxiliary index wheel having a slot extending radially inwardly from said peripheral edge to admit said index spring into driving engagement with a tooth of said index wheel, said slot having an initial position located in substantially the same radial plane as the tooth of said index wheel which is to be indexed, whereby the slot of said auxiliary index wheel is indexed along with said index wheel on the indexing stroke of said index spring and is returned to said initial position on the backswing motion of said index spring.

No references cited.